(12) United States Patent
Eenigenburg et al.

(10) Patent No.: US 9,623,788 B2
(45) Date of Patent: Apr. 18, 2017

(54) STRAP TENSIONING BUCKLE APPARATUS AND METHODS OF USING THE SAME

(71) Applicant: Holland LP, Crete, IL (US)

(72) Inventors: Mark B. Eenigenburg, Saint John, IN (US); Alexander Stiles, Park Forest, IL (US); Andrew Morin, Mokena, IL (US)

(73) Assignee: Holland LP, Crete, IL (US)

( * ) Notice: Subject to any disclaimer, the term of this patent is extended or adjusted under 35 U.S.C. 154(b) by 0 days.

(21) Appl. No.: 14/581,364

(22) Filed: Dec. 23, 2014

(65) Prior Publication Data

US 2015/0175050 A1    Jun. 25, 2015

Related U.S. Application Data

(60) Provisional application No. 61/919,899, filed on Dec. 23, 2013.

(51) Int. Cl.
*B60P 7/08* (2006.01)

(52) U.S. Cl.
CPC ......... *B60P 7/0838* (2013.01); *Y10T 24/2121* (2015.01); *Y10T 24/2175* (2015.01)

(58) Field of Classification Search
CPC . B60P 7/0838; Y10T 24/2121; Y10T 24/2175
See application file for complete search history.

(56) References Cited

U.S. PATENT DOCUMENTS

| | | | |
|---|---|---|---|
| 2006/0026803 A1* | 2/2006 | Chang | B25B 25/00 24/68 CD |
| 2007/0283540 A1* | 12/2007 | Chang | B60P 7/0838 24/68 CD |
| 2009/0106957 A1* | 4/2009 | Chang | B25B 25/00 24/68 CD |
| 2009/0133234 A1* | 5/2009 | Chang | B60P 7/0838 24/68 CD |

\* cited by examiner

*Primary Examiner* — Robert J Sandy
*Assistant Examiner* — Louis Mercado
(74) *Attorney, Agent, or Firm* — Scherrer Patent & Trademark Law, P.C.; Stephen T. Scherrer; Monique A. Morneault

(57) ABSTRACT

A strap tensioning buckle apparatus provides a ratchetless strap tensioning buckle apparatus for tensioning straps utilized in tying down objects. The ratchetless strap tensioning buckle apparatus has a base having a first end and a second end, a linkage pivotally attached to the base at a midpoint thereof, a handle having a first end and a second end, the handle having a shaft at the first end thereof for holding a loop of strap, the shaft further rigidly connecting the handle to the linkage, the handle pivoting via the linkage and moving the shaft in an arc from a first position to a second position, wherein moving the shaft from the first position to the second position tightens the strap and locks the strap in place.

18 Claims, 5 Drawing Sheets

STRAP TENSIONING BUCKLE APPARATUS AND METHODS OF USING THE SAME

The present invention claims prior to U.S. Provisional Patent App. No. 61/919,899, titled "Strap Tensioning Buckle Apparatus and Methods of Using the Same", filed Dec. 23, 2013, the entirety of which is hereby incorporated by reference.

TECHNICAL FIELD

The present invention relates to a strap tensioning buckle apparatus. Specifically, the present invention provides a ratchetless strap tensioning buckle apparatus for tensioning straps utilized in tying down objects. The ratchetless strap tensioning buckle apparatus comprises a base having a first end and a second end, a pair of linkages pivotally attached to the base at a midpoint thereof, a handle having a first end and a second end, the handle having a shaft at the first end thereof for holding a loop of strap, said shaft further rigidly connecting the handle to the linkage, said handle pivoting via the linkage and moving said shaft in an arc from a first position to a second position, wherein moving the shaft from the first position to the second position tightens the strap and locks the strap in place.

BACKGROUND

Buckles, of course, have been known for centuries for tying two ends of a strap, rope, string, belt, or other like flexible tie-down means. Specifically, a buckle is a device used for fastening two loose ends of a strap, rope, belt or other like band of flexible material, with one end attached to the band of flexible material and the other held by a catch in a secure but typically adjustable manner. Indeed, some of the earliest buckles were used by Roman soldiers to strap their body armor together.

Buckles and other tie-down equipment are commonly used to secure objects, such as objects, especially during transport thereof. However, it is often difficult to ensure secure fastening of objects, especially objects that may be bulky and/or heavy, or objects that may be subject to movement during transport thereof. To ensure a tight and secure fit of tie-down straps around an object, a number of types of buckles have heretofore been utilized.

The common buckle includes a frame, a chape, a bar and a prong. One end of a strap or belt is firmly attached to the buckle at the chape, and the loose end is typically wrapped around an object. The loose end is then threaded through the frame and over the bar, which may be disposed across the frame. The prong or tongue extends from the bar and engages a hole in the strap or belt. The prong holds the strap or belt in place through the frame. However, common buckles such as this are not typically designed to hold very high loads and may typically break or otherwise fail. Moreover, because the prong or tongue is disposed through a hole in the strap or belt, the hole is a point of weakness that is also prone to fail during use, especially when used to tie-down very heavy objects or objects under heavy load. A need, therefore, exists for a buckle apparatus and methods of using the same that may be utilized to tie down bulky and or heavy objects and provide securement of the same, especially during transport of the objects.

Tension buckles have also been used to tie down straps, and may be used for objects of relatively high loads. Specifically, a tension buckle typically includes a frame providing a serpentine passage for a loose end of a strap or belt. Once threaded through the buckle, the strap or belt may be looped back upon itself, providing tension due to friction of the strap against itself, especially when pulled. Thus, it may be relatively easy to tighten the strap or secure the same around the object, but it may be relatively difficult to loosen, thereby providing increased securement thereto, especially to larger or heavier objects. Tension buckles are useful, but are often difficult to utilize because one must thread the straps through the serpentine pathway of the buckle. Typically, tension buckles have fixed spaces for threaded straps or belts therethrough, and straps and belts are often bigger or thicker than the spaces may allow for easy threading. Thus, a need exists for a buckle apparatus and methods of using the same that allows for easy threading of a loose end of a strap or belt therethrough allowing for easy utilization by a user thereof.

A type of tensioning buckle includes a ratcheting system for tightening and/or securing the strap or belt around the object. Specifically, after threading the belt or strap therethrough, the buckle may include a lever or handle that is cranked by a user. A sprocket or gear and a pawl is typically mounted on a base, and when the lever or handle is cranked by the user, the sprocket or gear may turn, engaging the pawl when the teeth pass. Thus, the ratchet may allow for tightening of the strap or belt, but may prevent untightening of the same unless the pawl is released from the sprocket or gear. While ratchets are useful and may provide additional security to tie down straps or belts around objects, ratchets are typically quite heavy and difficult for a user to use. Moreover, the ratchet is only as strong as the teeth on the ratchet, and if failure occurs, it may be very difficult to prevent movement of the object that is tied down. A need, therefore, exists for a buckle apparatus and methods of using the same that provide sufficient security without being prone to failure. Moreover, a need exists for a buckle apparatus that is relatively light and easy to use.

As noted above, a ratcheting buckle requires release of the pawl from the teeth of the sprocket or gear to untighten or otherwise loosen the strap or belt from the buckle to remove from the object. The release mechanism may typically comprise a spring-loaded button or lever that may release the pawl from the sprocket or gear. However, the use of a release mechanism may present another opportunity for the buckle to fail, especially when under stress from a heavy load. Therefore, a need exists for a buckle apparatus and methods of using the same that is simple to use and easy to release, without complicated mechanisms for locking and/or releasing. Moreover, a need exists for a buckle apparatus and methods of using the same having a quick and easy release mechanism that is less prone to failure.

SUMMARY OF THE INVENTION

The present invention relates to a strap tensioning buckle apparatus. Specifically, the present invention provides a ratchetless strap tensioning buckle apparatus for tensioning straps utilized in tying down objects. The ratchetless strap tensioning buckle apparatus comprises a base having a first end and a second end, a linkage pivotally attached to the base at a midpoint thereof, a handle having a first end and a second end, the handle having a shaft at the first end thereof for holding a loop of strap, said shaft further rigidly connecting the handle to the linkage, said handle pivoting via the linkage and moving said shaft in an arc from a first position to a second position, wherein moving the shaft from the first position to the second position tightens the strap and locks the strap in place.

To this end, in an embodiment of the present invention, a buckle apparatus is provided. The buckle apparatus comprises a base having a first end and a second end and a first side and second side, the first end attachable to an end of a strap, and a pair of pivoting linkages at a midpoint of the base, said pivoting linkages having a horizontal bar traversing the base from the first side to the second side thereof, the linkages pivotally attached to the base at a first end of the linkage, said linkage having a shaft attached to a midpoint of the linkage extending from the first side of the base to the other side of the base, said shaft further attached to a handle on a first end of the handle, wherein when a loose end of a strap is threaded around a first side of the bar and looped around the shaft and the handle moves from a first position to a second position, the shaft moves in an arc over the bar from a first position to a second position, locking the strap and preventing movement thereof.

It is, therefore, an advantage and objective of the present invention to provide a buckle apparatus and methods of using the same that may be utilized to tie down bulky and or heavy objects and provide securement of the same, especially during transport of the objects.

Further, it is an advantage and objective of the present invention to provide a buckle apparatus and methods of using the same that allow for easy threading of a loose end of a strap or belt therethrough allowing for easy utilization by a user thereof.

Still further, it is an advantage and objective of the present invention to provide a buckle apparatus and methods of using the same that provide sufficient security without being prone to failure.

Moreover, it is an advantage and objective of the present invention to provide a buckle apparatus that is relatively light and easy to use.

In addition, it is an advantage and objective of the present invention to provide a buckle apparatus that is simple to use and easy to release, without complicated mechanisms for locking and/or releasing.

Further it is an advantage and objective of the present invention to provide a buckle apparatus and methods of using the same having a quick and easy release mechanism that is less prone to failure.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to a strap tensioning buckle apparatus. Specifically, the present invention provides a ratchetless strap tensioning buckle apparatus for tensioning straps utilized in tying down objects. The ratchetless strap tensioning buckle apparatus comprises a base having a first end and a second end, a linkage pivotally attached to the base at a midpoint thereof, a handle having a first end and a second end, the handle having a shaft at the first end thereof for holding a loop of strap, said shaft further rigidly connecting the handle to the linkage, said handle pivoting via the linkage and moving said shaft in an arc from a first position to a second position, wherein moving the shaft from the first position to the second position tightens the strap and locks the strap in place.

Figure 1:
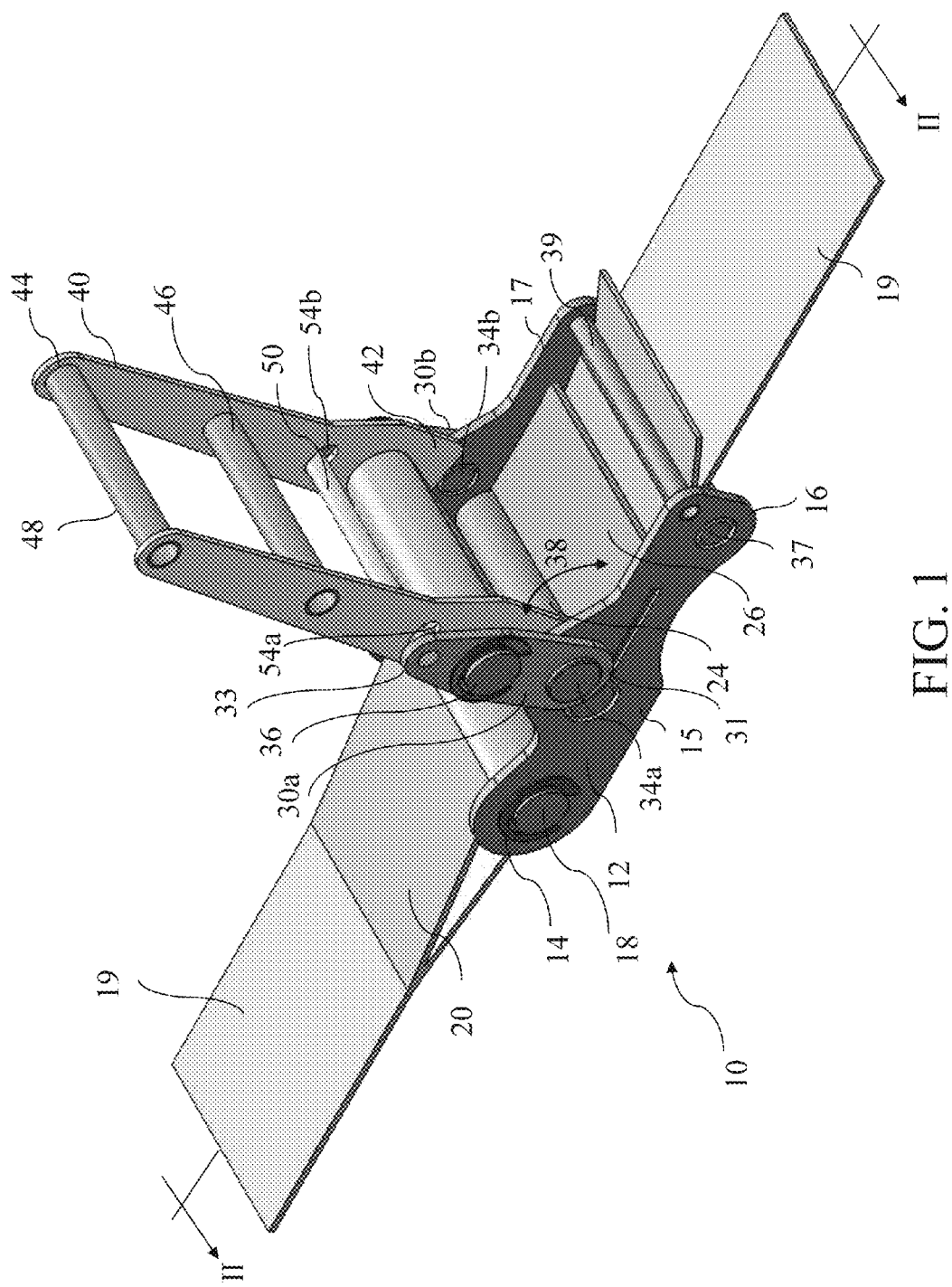
FIG. 1 illustrates a perspective view of a buckle of the present invention with a handle in an up and unlocked position in an embodiment of the present invention.
Figure 2:
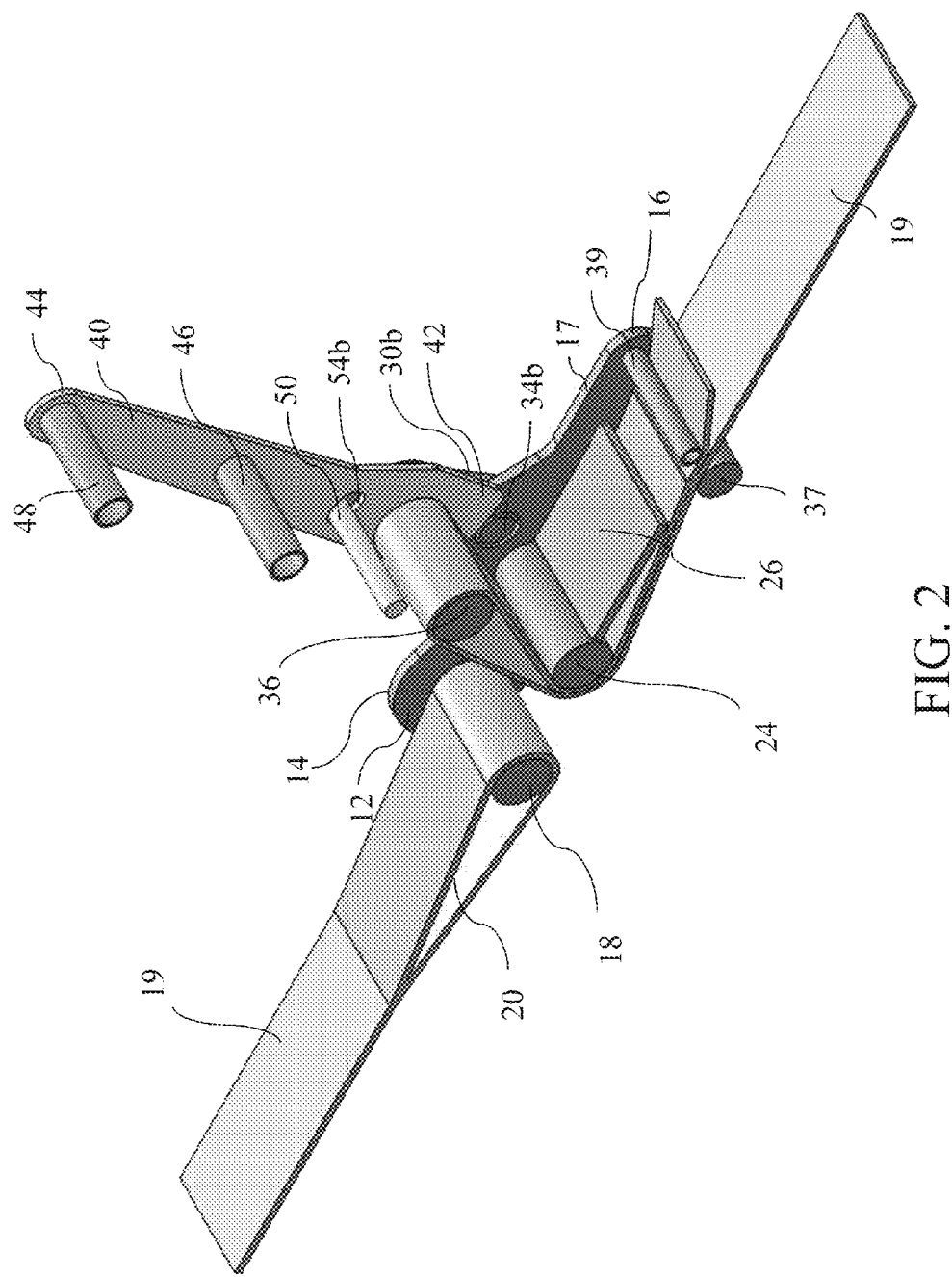
FIG. 2 illustrates a cut-away cross-sectional perspective view along line II-II of the buckle in an up and unlocked position in an embodiment of the present invention.

Now referring to the figures, wherein like numerals refer to like parts, FIG. 1 illustrates a buckle 10 in an embodiment of the present invention and FIG. 2 illustrates a cut-away cross-sectional view of the buckle 10 along line II-II of FIG. 1. The buckle 10 comprises a base 12 having a first end 14 and a second end 16, and a first side 15 and a second side 17, the base generally forming a frame between the first and second ends 14, 16 and the first and second sides 15, 17 for threading a strap or belt 19 therethrough. Disposed on the first end 14 is a static bar 18 spanning from the first side 15 to the second side 17 around which a loop 20 of the strap or belt 19 is wrapped. The loop 20 forms one end of the strap or belt 19, the other end of which may be disposed around an object for tying the object down and preventing movement thereof, the other end threaded through the buckle 10 and frictionally held in place as disclosed below. It should be noted that the strap or belt 19 may form a continuous loop and be disposed around an object for tying the object down. Alternatively, a first strap or belt may extend from the first end 14 of the buckle 10 and a second separate strap or belt may extend from the second end 16 of the buckle 10, and the buckle 10 may be used to tie together separate straps or belts.

Generally, the loop 20 of the strap or belt 19 is looped around the static bar 18 and stitched back onto itself to form the loop. The loop 20 may preferably be permanently mounted around the static bar 18, rigidly holding but allowing a freedom of rotational movement of the loop 19 around the static bar 18 and having sufficient strength to hold the loop of strap or belt 20 without failing under relatively heavy loads.

Disposed at roughly a midpoint on the base may be a first holding bar 24 spanning from the first side 15 to the second side 17 of the base 12, and forming a surface around which the strap or belt 19 may wrap when threaded through the buckle 10. The first holding bar 24 may be rigidly held between the first and second sides 15, 17 although the first holding bar 24 may optionally rotate, although in the preferred embodiment the first holding bar 24 merely presents a non-rotating smooth surface around which the strap or belt 19 may wrap. More preferably, a reinforcement plate 26 may extend from the first holding bar 24 and may be rigidly held, via welding or the like, between the first and second sides 15, 17, to reinforce the first holding bar 24, as the first holding bar 24 may bear a significant portion of the load of the buckle 10 when in use.

A first linkage 30a and a second linkage 30b may be pivotally attached to the first and second sides 15, 17, respectively, at pivot points 34a, 34b. The linkages 30a, 30b may have first ends 31 and second ends 33, and the linkages 30a, 30b may be pivotally attached to the first and second sides 15, 17, respectively, at their first ends 31 via pins or the like. At a midpoint between the first and second ends 31, 33 of the first and second linkages 30a, 30b may be a second holding bar 36 spanning between the first linkage 30a and the second linkage 30b.

The second holding bar 36 may follow an arcuate path due to the pivoting of the first and second linkages 30a, 30b around the pivot points 34a, 34b. The second holding bar 36 may have a surface for contacting the strap or belt 19. When threaded through the buckle 10, the strap or belt 19 may be disposed into the buckle 10 through the second end 16 of the base 12 between a lower bar 37 and an upper bar 39, wrapped around the surface of the first holding bar 24, looped around the second holding bar 36, then threaded back down between itself and the first holding bar 24, and then pulled rearwardly toward and through the second end 16 of the base 12 between the lower bar 37 and the upper bar 39 and out of the buckle 10, as illustrated in FIGS. 1 and 2. The end of the strap or belt 19 may be pulled to ensure that the strap or belt 19 is tightly held to the object.

A handle 40 having a first end 42 and a second end 44 may extend from the buckle 10 and may allow a user to rotate the linkages 30a, 30b and, thus, the second holding bar 36 through its path of travel 38 to tighten the belt within the buckle 10. The second holding bar 36 may span between the handle 40 at its first end 42 and may link the handle 40 to the linkages 30a, 30b. Generally, the handle 40 may have holes through which the second holding bar 36 is disposed, and thus the handle 40 may not be rigidly held to the linkages, but may be rotatably connected thereto, as discussed in more detail below in FIG. 5. The handle 40 may further have a reinforcing bar 46 and a gripping bar 48 for allowing a user to hold and move the handle 40.

At the second ends 33 of the linkages 30a, 30b may be a reinforcing bar 50 that may span between the first and second linkages 30a, 30b and provide further reinforcement between the linkages 30a, 30b. Because the linkages 30a, 30b may pivot on pivot points 34a, 34b, the reinforcing bar 50 may also follow an arcuate path 52 of a larger radius than the second holding bar 36. The reinforcing bar 50 may be disposed through slots 54a, 54b in the handle 40 so as not to be rigidly held therein, but allowing a small amount of movement or play of the handle 40 relative to the linkages 30a, 30b at the second ends 33 thereof, as discussed below in more detail with reference to FIG. 5.

Figure 3:
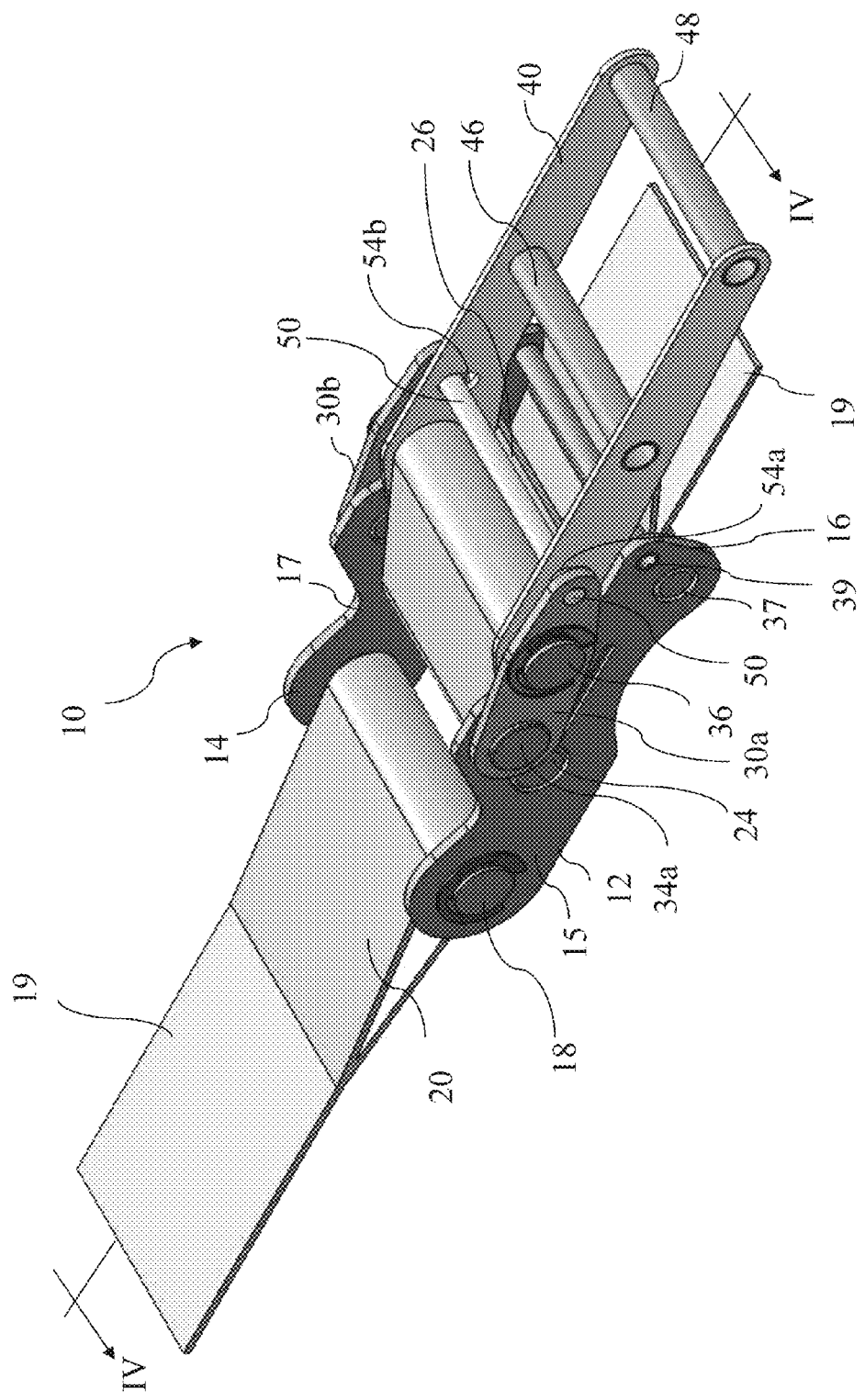
FIG. 3 illustrates a perspective view of a buckle of the present invention with its handle in a down and locked position in an embodiment of the present invention.
Figure 4:
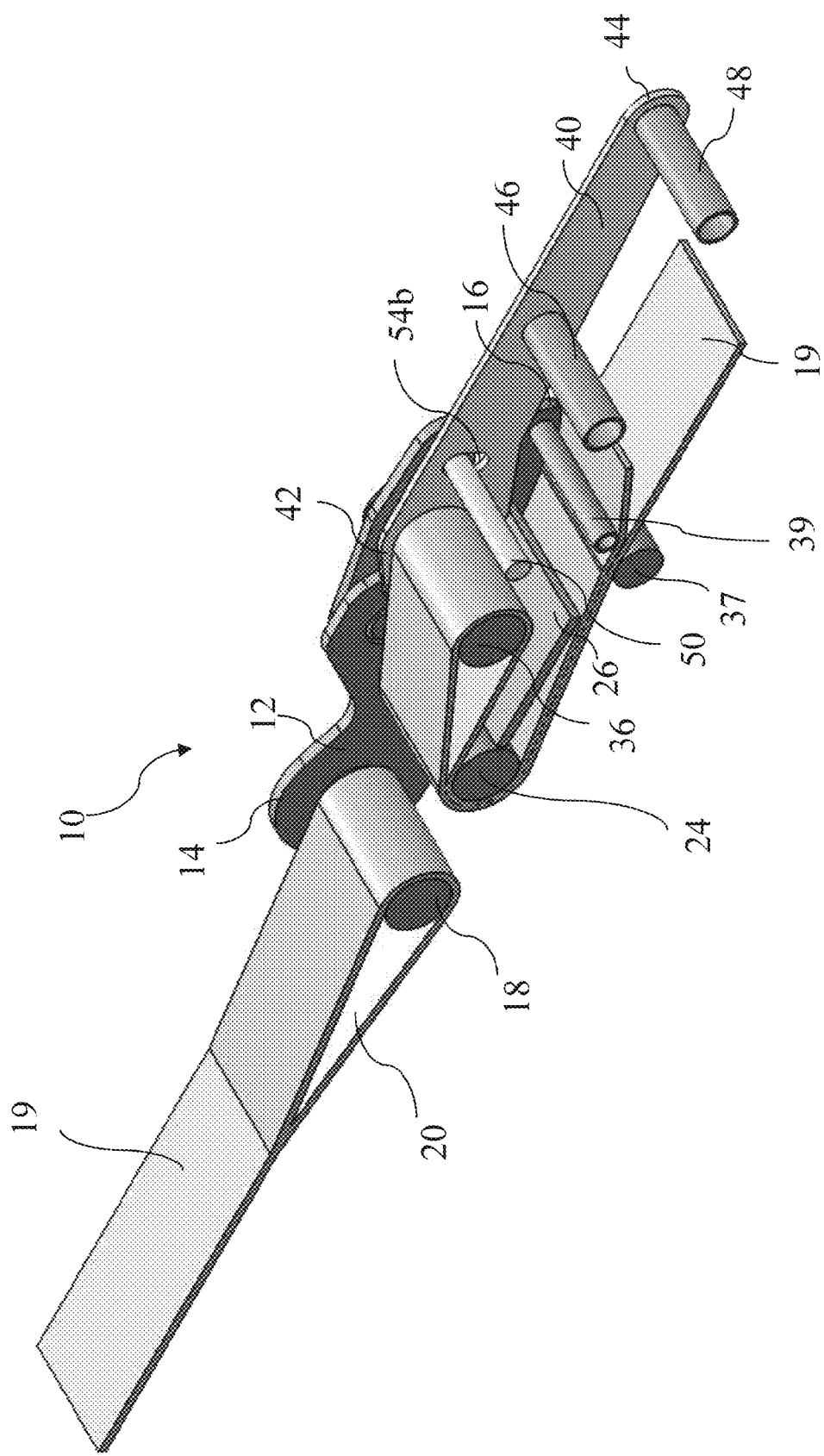
FIG. 4 illustrates a cut-away cross-sectional perspective view along line IV-IV of the buckle in a down and locked position in an embodiment of the present invention.

The second holding bar 36 forms an over-center element in the buckle 10 relative to the first holding bar 24. The over-center element may bias the second holding bar 36 in a down position, as illustrated in FIG. 3, which shows a perspective view of the buckle 10 with the handle 40 in the down position and FIG. 4, which shows a cut-away cross-sectional view of the buckle 10 with the handle 40 in the down position. Once the handle 40 and, thus, the second holding bar 36 are disposed in the down position, the friction induced on the strap or belt 19 is sufficient to rigidly hold the strap or belt 19 therein with relative strength and resiliency to hold the same when the strap or belt 19 are wrapped around an object, thereby holding the object even under relatively heavy loads.

Figure 5:
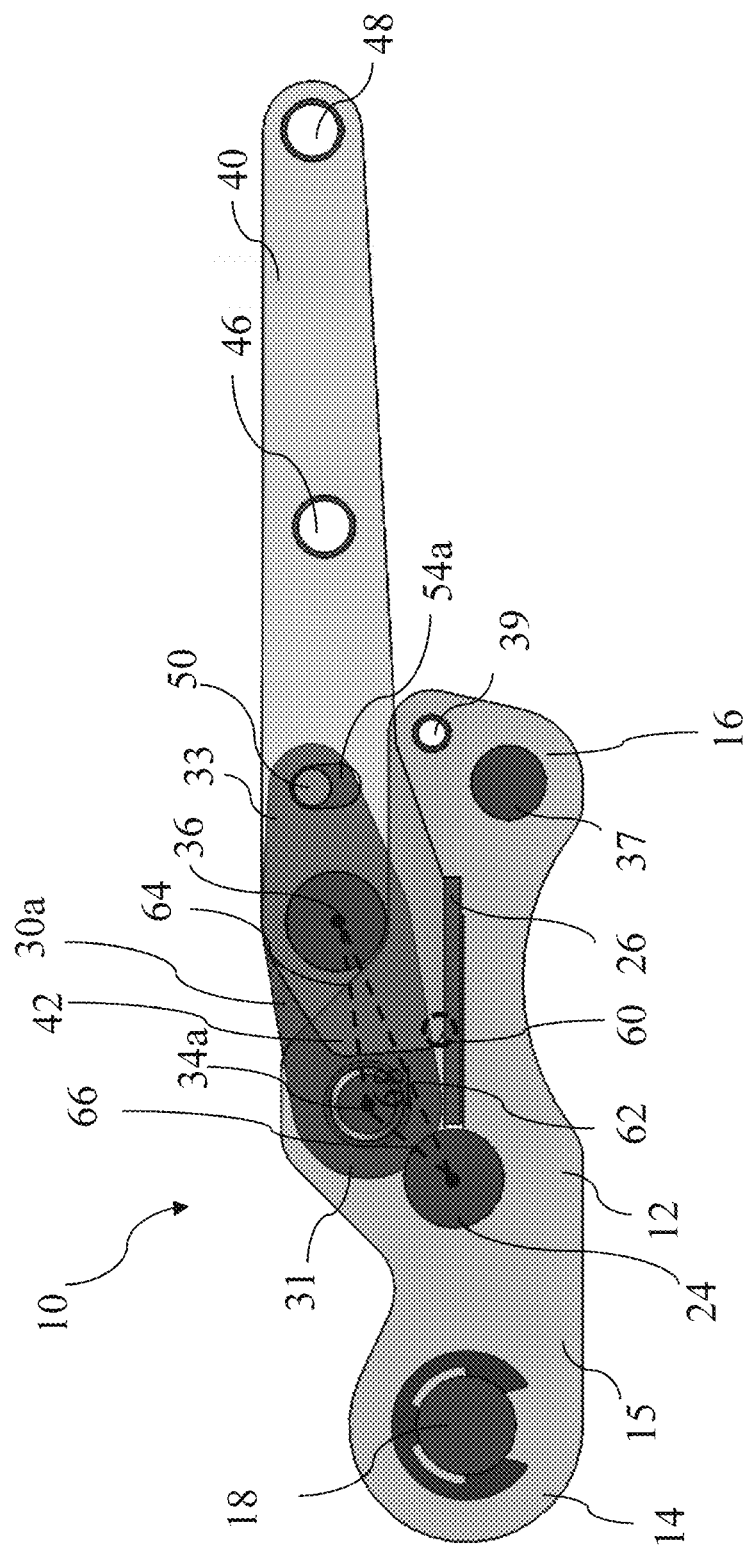
FIG. 5 illustrates a side view of the buckle in a down and locked position in an embodiment of the present invention.

The reinforcing plate 26 also presents a stopping surface for the handle 40 to rest on when in the down position, ensuring that the handle 40 is not pushed too far in the down position. This may allow a user to more easily release the tension induced on the strap or belt 19 by gripping the handle 40 by the gripping bar 48 and pulling upwardly. Further, the slots 54a, 54b allow a degree of movement or play of the handle 40 when pulled upwardly relative to the linkages 30a, 30b thus allowing the handle 40 to rotate slightly at a pivot point 60 (as illustrated in FIG. 5) where the end of the handle 42 meets the reinforcement plate 26, prior to the handle 40 pulling the second holding bar 36 upwardly when the reinforcing bar 50 meets the end of the slots 54a, 54b. This may further allow a user to more easily release the tension and friction induced on the strap or belt 19 when in the down position.

As disclosed above, the over-center element formed by the second holding bar 36 allow the buckle 10 to be locked when the handle 40 is disposed in a downward position, as the strap or belt 19 is effectively pulled rearwardly when looped around the second holding bar 36, inducing significant friction and tension on the strap or belt 19. The over-center element caused by the second holding bar 36 over the first holding bar 24 may bias the handle 40 downwardly in the locked position, and a user may release the tension and friction by pulling upwardly on the handle 40. When disposed in the down or locked position, the strap or belt 19 may further be tightened on the object the strap or belt 19 is wrapped around.

Referring now to FIG. 5, a side view of the first side 15 of the buckle 10 is illustrated. The buckle 10 includes the first holding bar 24 having the reinforcement plate 26 reinforcing the same and the second holding bar 36, wherein the first and second holding bars 24, 36 providing surfaces for wrapping the strap or belt 19 therearound (not shown in FIG. 5). As described above, the second holding bar 36 forms an over-center element relative to the pivot point 34a, when the second holding bar 36 travels in an arcuate path 38 (as illustrated in FIG. 1) as first linkage 30a pivots about pivot point 34a.

As shown in more detail in FIG. 5, the over-center element is formed between line 62 when the linkage 30a pivots about pivot point 34a, with line 64 being the radius formed between second holding bar 36 and pivot point 34a and line 66 formed between the pivot point 34a and the first holding bar 24. Lines 62, 64 and 66 form a triangle 68 that may change its shape as the second holding bar 36 rotates about pivot point 34a. Since lines 64 and 66 are static and because the strap or belt 19 wraps between the first and second holding bars 24, 36, respectively, there is a pulling force along line 62 from the second holding bar 36 toward the first holding bar 24. As the second holding bar 36 rotates over-center relative to the pivot point 34a, the pulling force along line 62 biases the second holding bar 36 downwardly toward the buckle 10, thereby effectively locking the second holding bar and, thus, the handle in place in the down position.

Optionally, a locking mechanism (not shown) may be provided to ensure that the handle 40 stays in the down and locked position, although the over-center bias of the handle 40 downwardly may present significant security that it will remain in a down and locked position until moved by a user, even without a locking mechanism. The optional locking mechanism may be a hook element, a spring-loaded pin, or other like mechanism apparent to one of ordinary skill in the art for holding the handle 40 in the down and locked position.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

The invention claimed is:

1. A buckle apparatus comprising:
    a base having a first end and a second end and a first side and second side, and a first shaft extending from the first side to the second side of the base at a midpoint between the first and second ends of the base, the first end of the base attachable to an end of a strap;
    first and second linkages extending from the base proximate the midpoint of the base, said first and second linkages having a first horizontal bar extending between and connected to the first and second linkages, the first and second linkages pivotally attached to the base at a first end of each at first and second pivot points, respectively, on the first and second sides of the base, respectively, said first and second linkages further having a second shaft attached to and connecting the first and second linkages at about a midpoint of each of the first and second linkages; and
    a handle comprising a first leg and a second leg, and a second horizontal bar connecting the first leg to the second leg, wherein the first leg is connected to and moves with the first linkage at the second shaft and the second leg is connected to and moves with the second linkage at the second shaft such that the handle moves from a first position to a second position through a pivotal movement of the first and second linkages,
    wherein the first leg of the handle has a first slot therein and the second leg of the handle has a second slot therein wherein the first horizontal bar between the first and second linkages is disposed through the first and second legs of the handle through the first and second slots, and further wherein the first and second legs of the handle are pivotally connected to the first and second linkages, respectively, at the second shaft wherein the first horizontal bar between the first and second linkages moves within the first and second slots of the handle,
    wherein when a loose end of a strap is threaded around the first shaft, looped around the second shaft, and threaded back around the first shaft, and the handle pivots from the first position to the second position, the second shaft moves in an arc over the first shaft from a first position to a second position, locking the strap and preventing movement thereof.

2. The buckle apparatus of claim 1 wherein the first end of the base is attached to a first end of a first strap.

3. The buckle apparatus of claim 2 wherein the second end of the first strap is threaded around the first shaft, looped around the second shaft, and threaded back around the first shaft.

4. The buckle apparatus of claim 2 wherein a first end of a second strap is threaded around the first shaft, looped around the second shaft, and threaded back around the first shaft.

5. The buckle apparatus of claim 1 further comprising:
    a third horizontal bar, said third horizontal bar extending between the first and second legs of the handle.

6. The buckle apparatus of claim 1 wherein the handle is positioned at an angle relative to the base when the handle is in the first position.

7. The buckle apparatus of claim 6 wherein the handle is positioned roughly perpendicular to the base when the handle is in the first position.

8. The buckle apparatus of claim 1 wherein the handle is positioned roughly parallel with the base when the handle is in the second position.

9. The buckle apparatus of claim 1 wherein the first and second legs of the handle are pivotally connected to the second shaft.

10. The buckle apparatus of claim 1 further comprising:
    a platform extending rearwardly from the first shaft and between the first and second sides of the base.

11. The buckle apparatus of claim 10 wherein when the loose end of the strap is threaded around the first shaft, looped around the second shaft, and threaded back around the first shaft, the strap is disposed beneath the platform.

12. The buckle apparatus of claim 1 wherein the first and second pivot points are positioned above and slightly rearwardly from the first shaft.

13. The buckle apparatus of claim 12 wherein the second shaft is disposed above the first and second pivot points when the handle is in the first position and is disposed rearwardly from the first and second pivot points when the handle is in the second position, the second shaft traversing in an arc when the handle moves between the first and second positions.

14. The buckle apparatus of claim 1 further comprising a lock for locking the handle into the second position.

15. The buckle apparatus of claim 1 further comprising:
    an upper bar extending from the first side to the second side of the base at the second end of the base; and
    a lower bar extending from the first side to the second side of the base at the second end of the base,
    wherein a strap is extendable between the upper bar and the lower bar.

16. The buckle apparatus of claim 15 further comprising:
    a strap extending between the upper bar and the lower bar.

17. The buckle apparatus of claim 1 wherein the first side of the base has an outside surface and an inside surface, and the second side of the base has an outside surface and an inside surface, wherein the first and second linkages are disposed adjacent the outside surfaces of the first and second sides of the base, respectively, and the first and second legs of the handle are disposed adjacent the insides surfaces of the first and second sides of the base, respectively.

18. The buckle apparatus of claim 17 wherein the first side of the base is disposed between the first leg of the handle and the first linkage, and the second side of the base is disposed between the second leg of the handle and the second linkage.

* * * * *